INVENTOR
Frank L. Furbush
By Attorneys

Patented Aug. 10, 1926.

1,595,829

UNITED STATES PATENT OFFICE.

FRANK L. FURBUSH, OF WESTFORD, MASSACHUSETTS, ASSIGNOR TO C. G. SARGENT'S SONS CORPORATION, OF GRANITEVILLE, MASSACHUSETTS, A CORPORATION OF MASSACHUSETTS.

FRUIT DRIER.

Application filed October 4, 1924. Serial No. 741,770.

This invention relates to a drier for fruit, particularly oranges, lemons, and the like.

The principal object of the invention is to provide a drier which will convey the fruit through it, continuously rotating it as it passes through, and supply continuously a current of air against and all around the surface of the fruit so as to reach all parts of the surface, and generally to increase the efficiency of driers of this character.

Reference is to be had to the accompanying drawings, in which—

Fig. 3 is an enlarged central sectional view of one of the rolls; and

Fig. 4 is a still further enlarged view of a roll.

Figure 1:
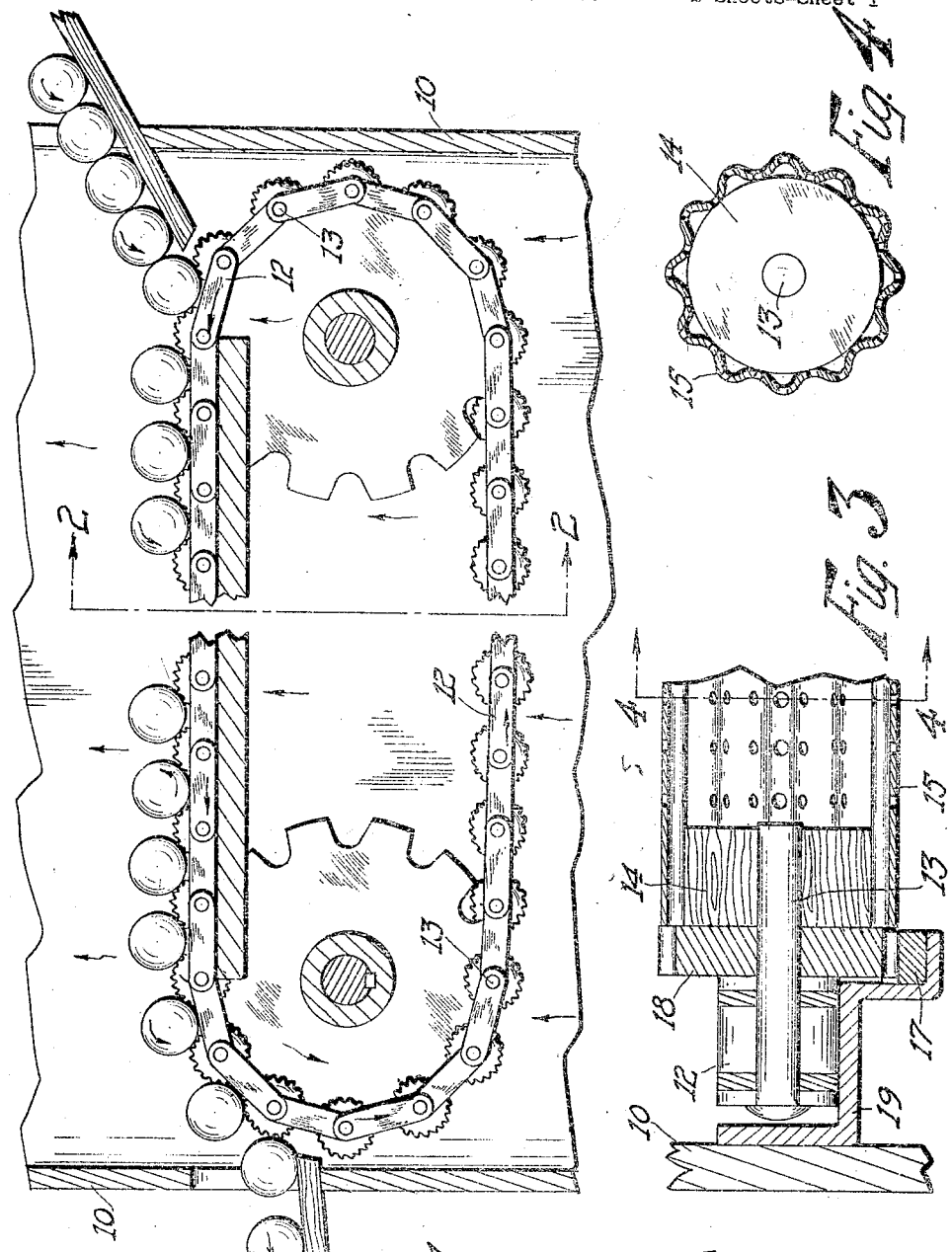
Fig. 1 is a sectional view of part of a drier constructed in accordance with this invention showing the conveyor in elevation.

Fruit of several kinds has to be washed before it can be packed and shipped, and the moisture has to be dried from the surface of the fruit either in a natural manner or otherwise. This machine is designed for removing this moisture very rapidly.

It has been proposed heretofore to mount a conveyor on rollers which roll along and rotate the fruit on their surfaces and force a current of air through the conveyor which these rollers constitute. The difficulty with this has been that the air was free to pass through only at points between the rolls, and consequently it did not have a free circulation on the sides of the fruit supported by the rolls. It is largely for the purpose of preventing the restricting of the circulation by the rolls themselves that this invention is made and to ensure that the air currents shall envelop the fruit and impinge against the entire surface thereof.

I have shown the invention as applied to an ordinary drying chamber 10 which may be of any shape and kind, but which is provided with blowers 11 along the lower side for drawing the air in and forcing it up through the drying chamber. In this drying chamber there is located an endless conveyor comprising two endless chains 12, the links of which are provided with gudgeons 13 where they are pivoted together. These gudgeons extend inwardly and pass into circular ends 14 in a series of rolls 15 so as to constitute studs for them. The rolls are free to rotate about the axes of these studs or gudgeons.

These rolls in their preferred form are made of sheet metal and perforated with a series of small perforations throughout their areas, and are entirely hollow so that the air can pass through and will not be obstructed by the roll. The air that passes through the rolls impinges directly on the fruit as shown supported by them, and thus the full effect of the currents of air is obtained for the purpose of drying the surface of the fruit.

I also prefer to make these rolls corrugated so that they will more positively roll the fruit over. This rolling action is secured by providing a pair of fixed racks 17 along the conveyor and providing each roll with a pair of spur gears 18 meshing with the racks. Fig. 3. As the conveyor moves along it will cause the rolls to rotate and the fruit to rotate with it, each one on its own axis as it travels along in the drying chamber. I have shown a pair of irons 19 along the sides of the chamber for supporting the racks 17 and also the chains.

Figure 2:
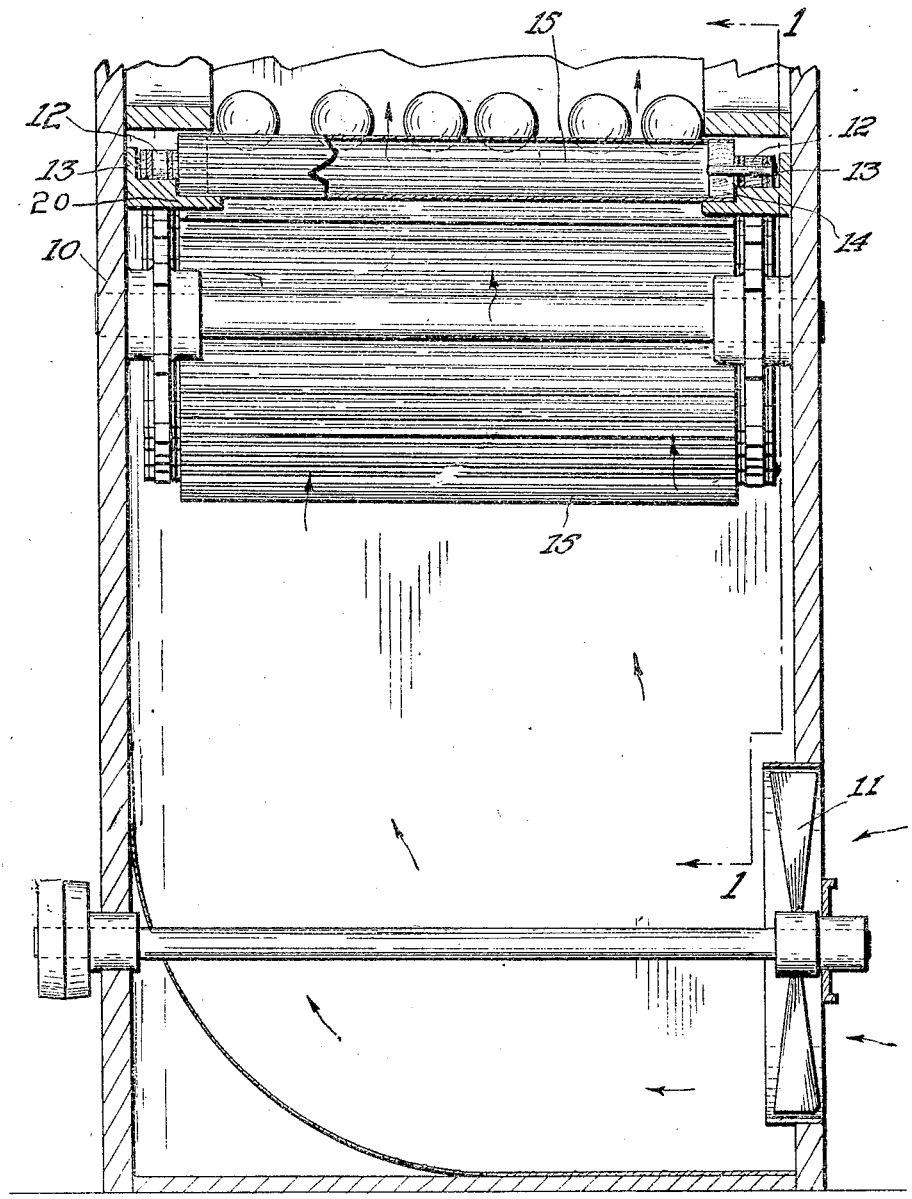
Fig. 2 is a sectional view of the same on the line 2—2 of Fig. 1.

Instead of racks the rolls can be rotated by engaging a plain surface, 20, Fig. 2, but this is less positive. Instead of corrugated sheet metal rolls they can be made of wood or iron and perforated so as to admit the air through them.

The operation of the device will be readily understood although I have not described the method of driving the endless chain conveyor or the way of feeding the fruit into and out of the drying chamber.

Although I have illustrated and described only a single form of the invention I am aware of the fact that modifications can be made therein by any person skilled in the art without departing from the scope of the invention as expressed in the claim.

Therefore I do not wish to be limited in these respects, but what I do claim is:—

In a fruit drier, the combination with an endless chain carrier for the fruit and means for forcing currents of air upwardly through the carrier to dry the fruit, a series of rolls mounted on the carrier for supporting the fruit between them on their external surface, said rolls being corrugated and provided with a series of perforations permitting the passage of air through each roll and contact against and around the entire surface of the fruit, and means for rotating each roll individually as it passes through the drier, whereby the fruit thereon is caused to rotate as it passes over and between each roll.

In testimony whereof I have hereunto affixed my signature.

FRANK L. FURBUSH.